United States Patent [19]

Suzuki et al.

[11] Patent Number: 4,963,805
[45] Date of Patent: Oct. 16, 1990

[54] NUMERICAL CONTROL APPARATUS FOR MACHINING NON-CIRCULAR WORKPIECES

[75] Inventors: Ikuo Suzuki, Chiryu; Takao Yoneda, Nagoya; Toshio Tsujiuchi; Naoki Arimoto, both of Kariya, all of Japan

[73] Assignee: Toyoda Koki Kabushiki Kaisha, Kariya, Japan

[21] Appl. No.: 310,521

[22] Filed: Feb. 14, 1989

[30] Foreign Application Priority Data

Feb. 15, 1988 [JP] Japan .................................. 63-32523

[51] Int. Cl.⁵ .............................................. G06F 15/46
[52] U.S. Cl. ................................ 318/569; 364/474.06;
            51/165.71; 318/571; 318/573
[58] Field of Search ........................... 318/561-577;
     364/474.06, 474.24, 474.32, 474.36, 474.31;
                       51/165.71, 97 NC, 165.75, 95 GH

[56] References Cited

U.S. PATENT DOCUMENTS

| | | |
|---|---|---|
| 3,344,559 | 10/1967 | Inaba et al. |
| 3,482,357 | 12/1969 | Inaba et al. |
| 3,619,581 | 11/1971 | Kimura et al. |
| 3,917,930 | 11/1975 | Davey et al. |
| 4,206,393 | 6/1980 | Chiba . |
| 4,214,309 | 7/1980 | Koide et al. ................ 364/474.06 X |
| 4,293,913 | 10/1981 | Nishimura et al. ........... 51/165.71 X |
| 4,423,481 | 12/1983 | Reid-Green et al. . |
| 4,484,413 | 11/1984 | Yamamoto et al. ....... 364/474.06 X |
| 4,498,259 | 2/1985 | Yamamoto et al. ........ 364/474.06 X |
| 4,791,575 | 12/1988 | Watts Jr. et al. ............... 318/569 X |
| 4,815,000 | 3/1989 | Yoneda et al. ........................ 474.34/ |
| 4,848,038 | 7/1989 | Maruyama et al. ........... 364/474.06 |
| 4,884,373 | 12/1989 | Suzuki et al. .................... 364/474.06 |

FOREIGN PATENT DOCUMENTS

52-133198 11/1977 Japan .
52-144895 12/1977 Japan .

*Primary Examiner*—William M. Shoop, Jr.
*Assistant Examiner*—Paul Ip
*Attorney, Agent, or Firm*—Oblon, Spivak, McClelland, Maier & Neustadt

[57] ABSTRACT

A numerical control apparatus for machining non-circular workpieces such as a cam and the like has been disclosed. The cam and the like are used in changing the operation from rotational to linear motion. In designing the shape of the cam and the like, lift data prescribing the relationship between the rotational and linear motions is used. The lift data is given by the position sequence on the linear motion corresponding to a number of discrete rotational angles. Also, the tolerance of the positions is given from a functional aspect. The lift data is converted into profile data prescribing the shape of the cam and the like after being smoothed within the tolerance by a regression analysis, and machining of the non-circular workpieces is effected according to the profile data.

6 Claims, 6 Drawing Sheets

NUMERICAL CONTROL APPARATUS FOR MACHINING NON-CIRCULAR WORKPIECES

BACKGROUND OF THE INVENTION

The present invention relates to a numerical control apparatus for controlling machining of non-circular workpieces (hereinafter merely referred to as a workpiece) such as a cam and the like.

Conventionally, a process for grinding the workpiece such as the cam by controlling a feed of grinding wheel the direction of which is perpendicular to a main spindle, with the numerical control apparatus in synchronism with the rotation of the main spindle is known. It is necessary to provide profile data to the numerical control apparatus for synchronizing control of the grinding wheel feed. The profile data provides the feed amount of the grinding wheel per a unit rotational angle of the main spindle so as to reciprocate the grinding wheel, that is to give it the profile creating motion along the finished shape of the workpiece.

The profile data is obtained from lift data of the non-circular workpiece and the grinding wheel diameter.

While, though the non-circular workpiece such as the cam is used to change the circular motion into linear motion, displacement characteristics of a tappet in contact with the surface of the cam relative to the rotational angle of the cam is required from the performance of machines using the cam. For example, in the case of the cam-shaft of an internal combustion engine, in order to improve acceleration and high speed performance of a motor vehicle, the relationship between a crank angle and the tappet displacement is determined from the functional aspect.

As such, when designing the cam shape, since the relationship between the rotational angle and the linear motion displacement for realizing the desired motion is given in sequence of points from the functional aspect of the cam, the cam shape for realizing the motion accurately does not necessarily vary smoothly.

Though the non-circular workpiece is machined by controlling the rotating position of the main spindle and the feeding position of the grinding wheel in synchronism, since follow-up delay and errors are occurred in a servo-control mechanism due to the inertia of movable bodies such as a wheel head and the clearance of a feed screw, it is impossible to machine the workpiece exactly to the finished shape required from the operating characteristics of the cam. The follow-up errors also become larger as the rotating speed of the main spindle increases.

Accordingly, in order to machine the workpiece as close as possible to the required finished shape, machining must be performed extremely slowly.

The more are the higher order frequency components included in the required finished shape of the cam, the more are the high frequency vibration components included in the servo-control mechanism, deteriorating the machining accuracy.

SUMMARY OF THE INVENTION

The present invention has been devised to solve the aforementioned problems, therefore, it is an object thereof to machine non-circular workpieces in a high surface accuracy at a high speed within a tolerance with respect to a required finished shape.

The shape of the non-circular workpiece is given by lift data showing the relationship between the rotational angle and lift amount. The lift data specifies the shape of the non-circular workpiece in sequence of points Using the lift data comprising the sequence points, smooth curves approximating the point sequence are obtained such that deviations between positions of points on the smooth curves and the finished shape become less than a predetermined tolerance. By generating numerical values from the smooth curves at every predetermined rotational angle, compensated lift data which is given in sequence of points and varies smoothly with respect to the rotational angle is obtained. Thereafter, the compensated lift data is converted into profile data representing feeding positions of the grinding wheel with respect to the rotational angle, and on the basis of the profile data, the main spindle and the tool-feed shaft positions are controlled in synchronism to machine the non-circular workpiece.

DESCRIPTION OF THE INVENTION

The present invention will be described in response to a specific embodiment as follows.

Figure 1:
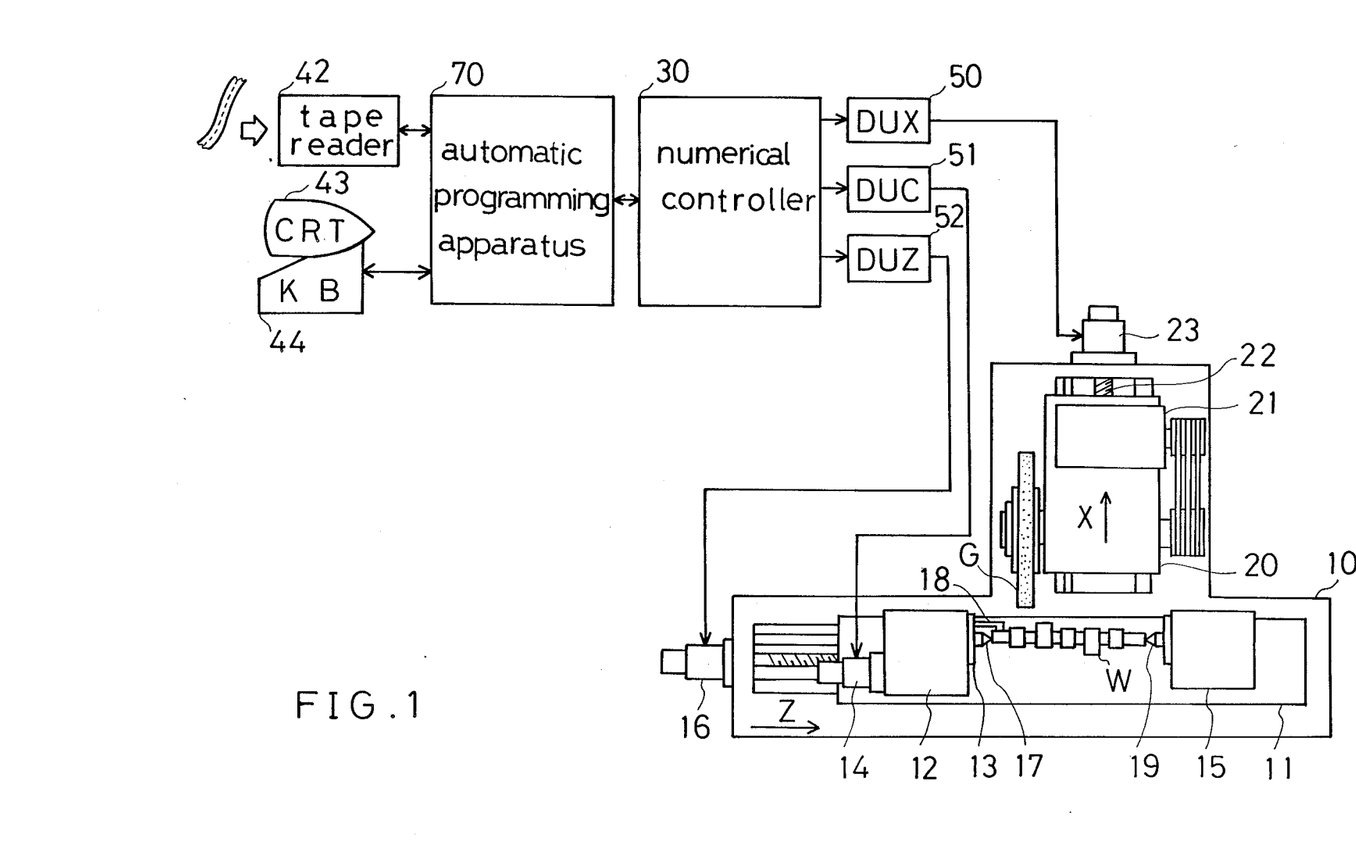
FIG. 1 is a block diagram showing the whole configuration of a numerical control grinding machine using a numerical control apparatus according to one specific embodiment of the present invention.

In FIG. 1, the numeral 10 indicates a bed of a numerical control grinding machine, whereon a table 11 which is driven by a servo motor 16 via a feed screw mechanism is disposed slidably in the direction of Z-axis which is in parallel to a main spindle axis. On the table 11, a head-stock 12 supporting a main spindle 13 driven by a servo motor 14 is provided. On the right end of the table 11, a tail stock 15 is mounted, and a workpiece W consisting of a cam-shaft is clamped by a center 19 of the tail stock 15 and a center 17 of the main spindle 13. The workpiece W is engaged to a positioning pin 18 projected from the main spindle 13, to be locked in a phase of rotation to the main spindle 13.

Behind the bed 10, a wheel head 20 which is movable back and forth toward the workpiece W is guided and provided with a grinding wheel G driven by a motor 21. The wheel head 20 is coupled to a servo motor 23 via a feed screw 22, and moved back and forth by the normal and reverse rotations of the servo motor 23.

Drive units 50, 51 and 52 are circuits for receiving command pulses from a numerical controller 30 to drive the servo motors 23, 14 and 16 respectively.

Figure 2:
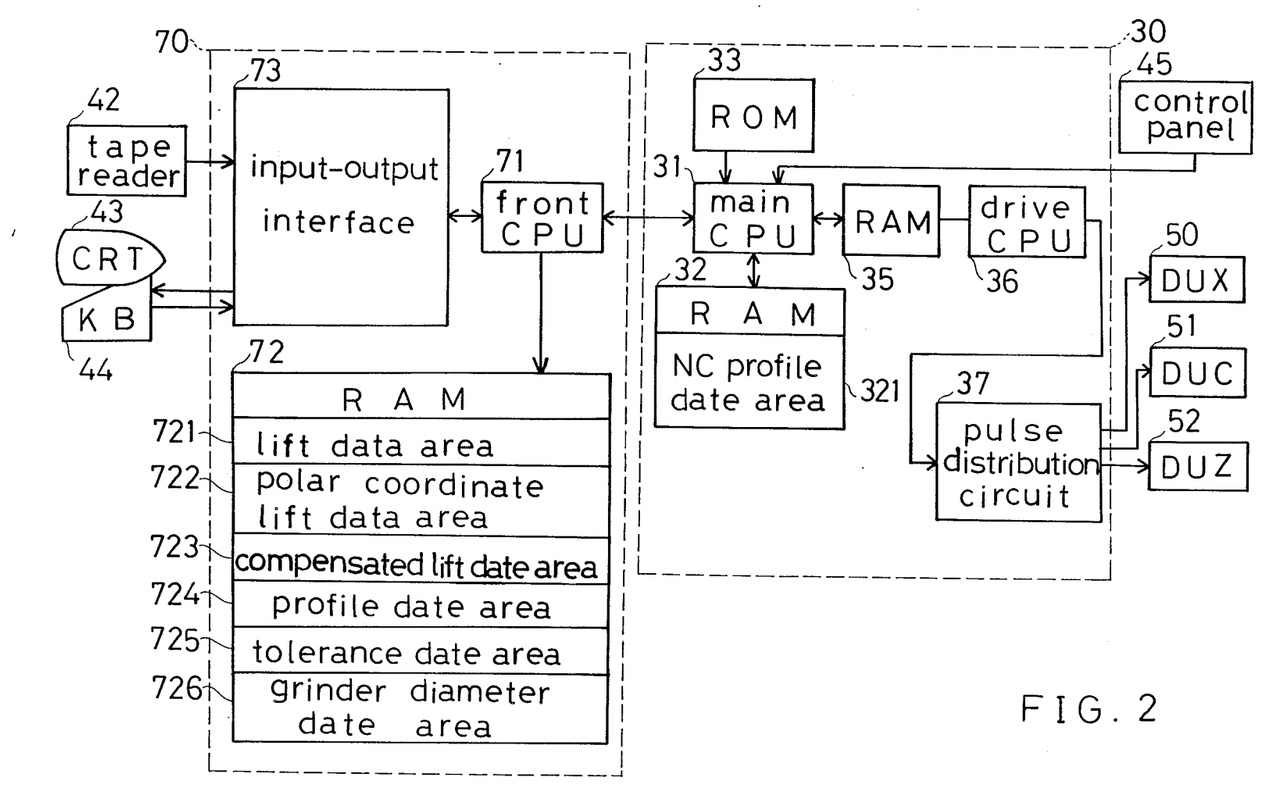
FIG. 2 is a block diagram showing an electrical configuration of a numerical control apparatus according to the same embodiment.

The numerical controller 30 mainly controls the rotation of the control axes numerically to grind the workpiece W and dress the surface of the grinding wheel G. As shown in FIG. 2, the numerical controller 30 mainly comprises a main CPU 31 for controlling the grinding machine, a ROM 33 storing the control program and a RAM 32 storing input data. On the RAM 32, an NC profile data area 321 for storing the NC profile data is formed.

As driving systems of the servo motors 23, 14 and 16, a drive CPU 36, a RAM 35 and a pulse distribution circuit 37 are provided in the numerical controller 30. The RAM 35 is a memory to which positioning data of the grinding wheel G, table 11 and main spindle 13 are inputted from the main CPU 31.

The drive CPU 36 calculates the process of the slow-up, slow-down and interpolation to the target point with respect to the control axes related to machining, and outputs positioning data of the interpolation points periodically, and the pulse distribution circuit 37 outputs operation command pulses to respective drive units 50, 51 and 52 after the pulse distribution.

An automatic programming apparatus 70 connected to the numerical controller 30 generates profile data automatically from the lift data and grinding wheel diameter, and comprises a front CPU 71, a RAM 72 and an input-output interface 73. In the RAM 72, a lift data area 721 for storing the lift data of a plurality of workpieces, a polar coordinates lift data area 722 for storing the lift data after conversion to polar coodinates, a compensated lift data area 723 for storing the correct lift data resulted from smoothing the polar coordinates lift data within a tolerance, a profile data area 724 for storing the profile data converted from the compensated lift data, a tolerance data area 725 for storing the tolerance of finished shapes of a workpiece, and a grinder diameter data area 726 for storing the grinder diameter when generating the profile data are formed.

To the front CPU 71, a tape reader 42 which inputs lift data etc., a CRT display 43 for displaying the data and a key-board 44 for inputting the data are connected via the input-output interface 73.

Operations will be described in the following.

When the present apparatus is set in the data input mode, all lift data necessary for machining are read from the tape reader 42 by the front CPU 71 via the input-output interface 73 and stored in the lift data area 721.

Figure 4:
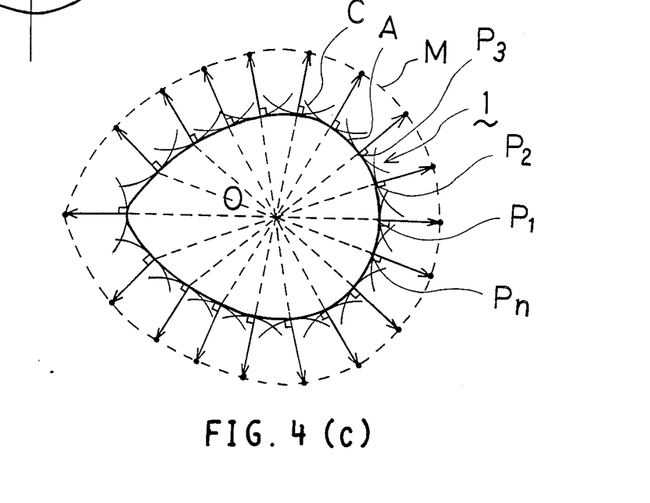
FIG. 4(a) is an explanatory view for explaining a lift amount of a flat tappet with respect to the rotational angle of a cam.
FIG. 4(b) is an explanatory view for explaining polar coordinate lift data.
FIG. 4(c) an explanatory view for explaining a method for obtaining profile data.

As shown in FIG. 4(a), the lift data is represented by a moving amount or a lift amount of the flat tappet 3 which is, when the cam 1 is rotated, contacted to the cam 1 and movable in the direction of X-axis. Thus, if the rotational angle $\theta$ of the cam 1 is defined by the rotational angle of the reference point Q on a base circle 2, the lift amount $\Delta X(\theta)$ is obtained as a function of $\theta$. The lift data to be inputted is given, for example, in point sequence of the lift amount $\Delta X(\theta)$ at every rotational angle of 0.5°. Since the contact position on the flat tappet 3 to the cam 1 varies responsive to the rotation of cam 1, the lift data by the flat tappet are not given by the point sequence at every equicentral angle on the profile line of the cam 1.

Figure 3:
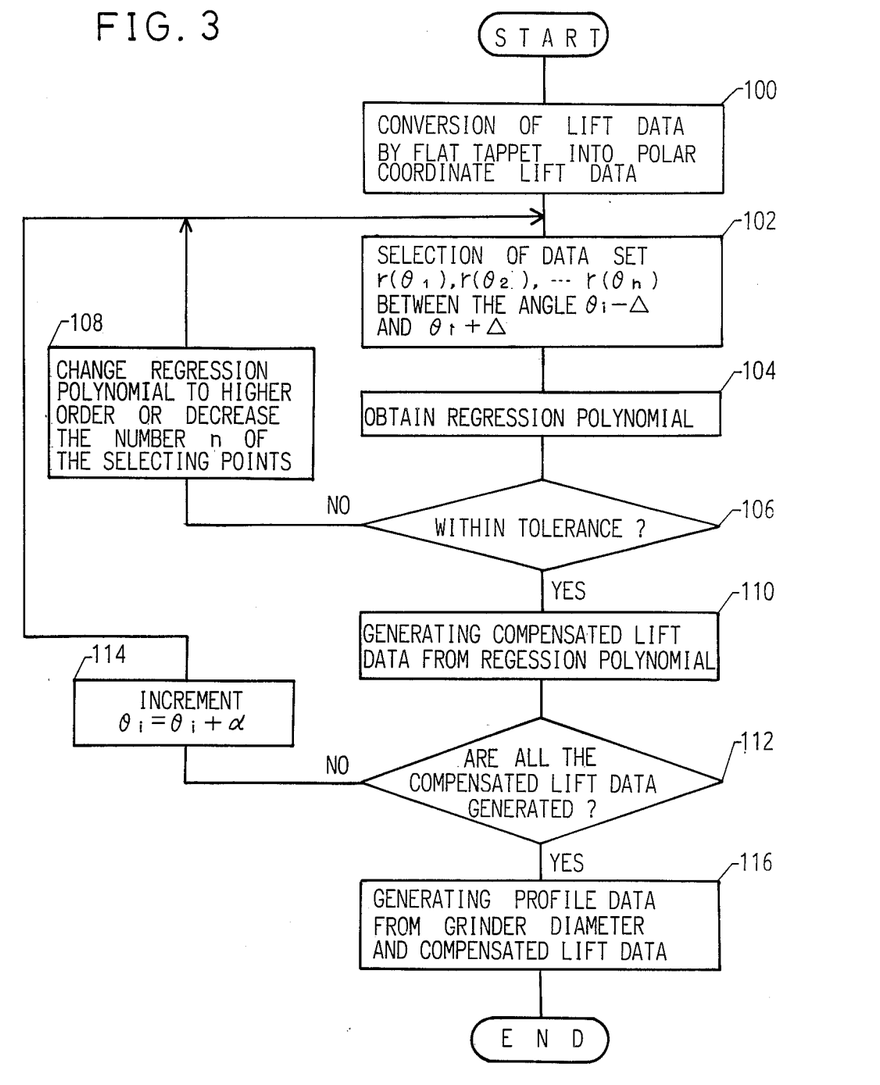
FIG. 3 flow chart showing processing procedures of a front CPU 71 used in a numerical control apparatus according to the same embodiment.

Next, when the apparatus is set in the profile data generating mode, the front CPU 71 executes the program of FIG. 3.

In Step 100, the lift data stored in the lift data area 721 is converted into the polar coordinate lift data, which is stored in the polar coordinate lift data area 722. The polar coordinate lift data is, as shown in FIG. 4(b), obtained by specifying the point sequence on the profile line of the cam 1 by the central angle $\theta$ and the length $r(\theta)$ of the radius vector. The polar coordinate lift data is converted from the lift data by the flat tappet in consideration of the relationship of contact between the flat tappet 3 and cam 1 shown in FIG. 4(a).

Figure 5A:
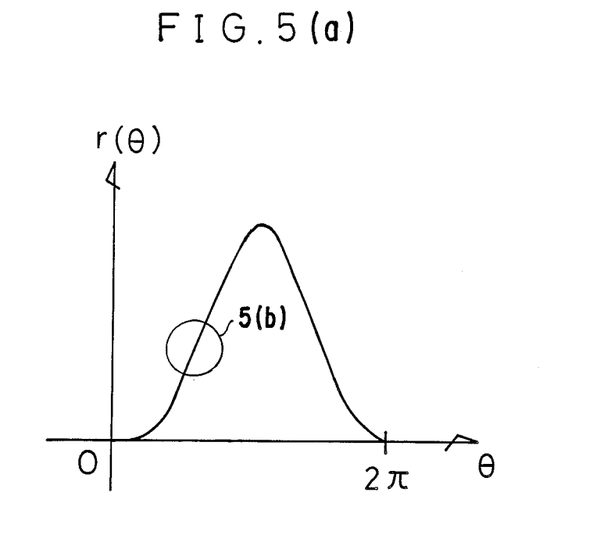
FIGS. 5(a)-5(b) explanatory views for explaining smoothing of the polar coordinate lift data.
Figure 5B:
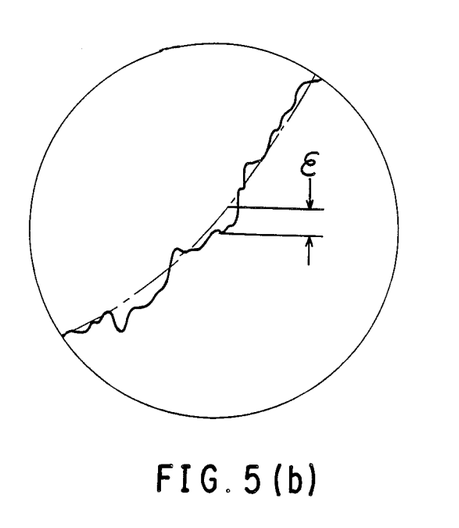

When the lift data given from the operational characteristic requirement is converted into the polar coordinate lift data to plot the length $r(\theta)$ of the radius vector, it is not so smooth as shown in FIG. 5. Therefore it is necessary to find a curve approximated smoothly to the point sequence.

Then, execution continues in Step 102, in which the data set $r(\theta_1), r(\theta_2), \ldots r(\theta_n)$ is selected from the polar coordinate lift data between the angle $\theta_i - \Delta$ and $\theta_i + \Delta$ ($\Delta = 10°$), where $\theta_i$ is the angle for which the smoothed compensated lift data which is to be calculated.

Then, in Step 104, regression analysis by a least square approximation is executed with respect to the selected data set. The regression polynomial $f(\theta)$ is given by $$f(\theta) = a_0 + a_1\theta + a_2\theta^2 + \ldots + a_m\theta^m \tag{1}$$

where $a_0, a_1, \ldots, a_m$ are regression coefficients and m is the order of the polynomial.

Here the next matrix equations are formed between the data $r(\theta_1), , r(\theta_n)$ and the polynomial $f(\theta)$;

$$R = X \cdot A + E \tag{2}$$

where $$R = \begin{pmatrix} r(\theta_1) \\ r(\theta_2) \\ \cdot \\ \cdot \\ \cdot \\ r(\theta_n) \end{pmatrix} \tag{3}$$

$$X = \begin{pmatrix} 1 & \theta_1 & \theta_1^2 & \ldots & \theta_1^m \\ 1 & \theta_2 & \theta_2^2 & \ldots & \theta_2^m \\ \cdot & \cdot & \cdot & & \cdot \\ \cdot & \cdot & \cdot & & \cdot \\ \cdot & \cdot & \cdot & & \cdot \\ 1 & \theta_n & \theta_n^2 & \ldots & \theta_n^m \end{pmatrix} \tag{4}$$

$$A = \begin{pmatrix} a_0 \\ a_1 \\ \cdot \\ \cdot \\ \cdot \\ a_m \end{pmatrix} \tag{5}$$

$$E = \begin{pmatrix} e_1 \\ e_2 \\ \cdot \\ \cdot \\ \cdot \\ e_n \end{pmatrix} \tag{6}$$

The element $e_k$ of the matrix E means an error between the function value $f(\theta_k)$ and the data $r(\theta_k)$.

From Eq. (2), we get $$E = R - X \cdot A \tag{7}$$

and $$E^t = R^t - A^t \cdot X^t \tag{8}$$

where $E^t$, $R^t$, $A^t$ and $X^t$ are the transposed matrixes of the matrixes E, R, A, and X, respectively.

Therefore, from Eqs. (7) and (8), square sum g of the errors is given by $$\begin{aligned} g &= e_1^2 + e_2^2 + \ldots + e_n^2 = E^t \cdot E = (R^t - A^t X^t)(R - XA) \\ &= R^t R - A^t X^t R - R^t XA + A^t X^t XA \end{aligned} \tag{9}$$

The conditions for minimizing the square sum g are $$\frac{\delta g}{\delta A} = \begin{pmatrix} \frac{\delta g}{\delta a_0} \\ \frac{\delta g}{\delta a_1} \\ \cdot \\ \cdot \\ \cdot \\ \frac{\delta g}{\delta a_n} \end{pmatrix} = \begin{pmatrix} 0 \\ 0 \\ \cdot \\ \cdot \\ \cdot \\ 0 \end{pmatrix} \tag{10}$$

When we differentiate Eq. (9) by A, we get $$\begin{aligned} \delta g / \delta A &= -X^t R - (R^t X)^t + X^t XA + (A^t X^t X)^t \\ &= -X^t R - X^t R + X^t XA + X^t XA \\ &= -2X^t R + 2X^t XA \end{aligned} \tag{11}$$

From $\delta g/\delta A = 0$, we get $$2X^t XA = 2X^t R$$

then $$A = (X^t X)^{-1} \cdot X^t \cdot R \tag{12}$$

where $(X^t X)^{-1}$ is the inverse matrix of $X^t X$.

From Eq. (12), we get the regression coefficients of the regression polynomial $F(\theta)$.

By the procedure described above, the regression polynomial $f(\theta)$ can be found with respect to the data set $r(\theta_1)$, $r(\theta_2)$, ..., $r(\theta_n)$.

Then, the CPU 71 moves to Step 106, wherein the deviation $|r(\theta_i) - f(\theta_i)|$ at the angle $\theta_i$ is calculated, and it is determined whether the deviation is within a tolerance $\epsilon$ stored in the tolerance data area 725 or not. If the deviation is not within the tolerance, the procedure of the CPU 71 continues in Step 108, wherein the regression polynomial is changed to a higher order from a low order or the number n of selecting points is decreased, and returns to Steps 102 and 104 wherein the new data set is selected, or the regression curve is calculated by a higher order regression polynomial.

Thus, in Step 106, the order of regression polynomial is changed until the deviation $|r(\theta_i) - f(\theta_i)|$ becomes less than the tolerance $\epsilon$, and finally a smoothly approximated regression polynomial within the tolerance is obtained Execution continues in Step 110, wherein the compensated lift data $f(\theta_1)$ at the angle $\theta_i$ is calculated by the function value of the regression polynomial, and the compensated lift data is stored in the compensated lift data area 723.

Then, execution continues in Step 112 in which it is determined whether all the compensated lift data are generated or not.

Figure 6:
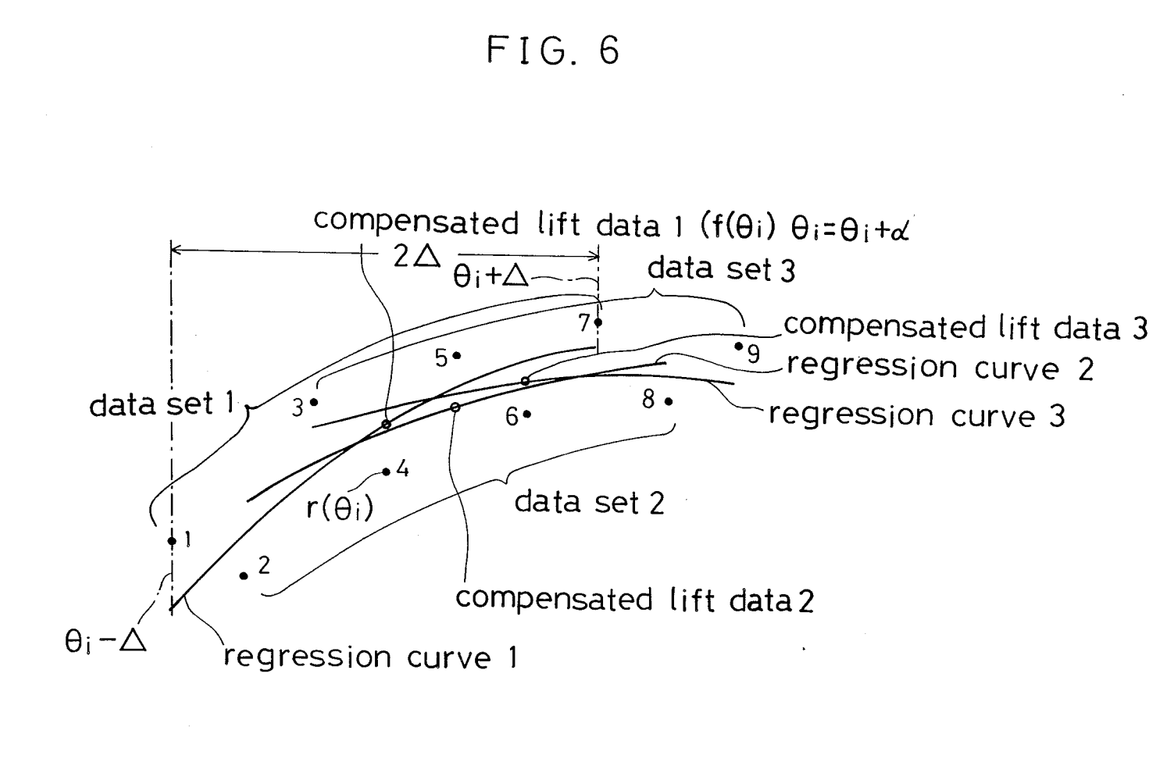
FIG. 6 is an explanatory view for explaining a method for generating the compensated lift data.

If the judgement in Step 112 is negative, execution continues in Step 114 in which the angle $\theta_i$ is increased by $\theta_i = \theta_i + \alpha (\alpha = 0.5°)$. Then, the procedure of the CPU 71 returns to Step 102 in which a new data set is selected. After in Step 104 a new regression polynomial is determined with respect to the new data set, in Step 110 a new compensated lift data $f(\theta_i)$ is generated at the next angle $\theta_i$. By repeating the procedure of Step 102 to 112, all the compensated lift data are generated along all the profile line of claim 1. And the compensated lift data are stored into the compensated lift data area 723. The above described procedure is shown conceptually in FIG. 6.

Then, the CPU 71 moves its procedure to Step 116 and calculates the profile data from the existing grinder diameter R stored in the grinder diameter data area 728 and the compensated lift data. The profile data is obtained as shown in FIG. 4(c). First, a locus of the center M of a circle C of radius R (grinder diameter) contacting the profile line A at discrete points $P_1$, $P_2$, ... $P_n$ at every equicentral angle on the profile line of the cam 1 is obtained, and then the profile data indicating the grinding wheel position at every equicentral angle is obtained from the distance between the center M and the center O of the cam 1. The profile data is stored in the profile data area 724 and transferred to the NC profile data area 321 via the front CPU 71 and main CPU 31 at actual machining of a cam.

When the machining command signal is given from a control panel 45, the main CPU 31 outputs the machining command to execute the cam grinding according to the NC profile data stored in the NC profile data area 321.

In the aforesaid embodiment, by the way, though data by the flat tappet is shown as the lift data given first, the lift data by the roller tappet and knife-edge tappet may also be given. Also, though the curve smoothed by polar coordinate lift data was obtained, a curve smoothed by other lift data and profile data may be obtained. It is also possible that after grinding a cam using the profile data converted from the smoothed lift data, the shape of the cam is measured to obtain errors in cam shape at many points, and after obtaining the curve for smoothing the errors, the initially smoothed left data is compensated by the curve additionally. Furthermore, the compensated lift data may be smoothed again.

Also, though the smoothing curve was found which approximated the point sequence selected within a narrow domain (about 20°) of the rotational angle given by the lift data, and one of the compensated lift data was generated from the central point of the domain on the regression curve, and by executing successively such a process with shifting the domain by a certain angle were generated all the compensated lift data, it is also possible that after finding a regression polynomial defining a regression curve approximating all the point sequence given by all the lift data, all the compensated lift data are generated by calculating the function value of the regression polynomial on many points.

In the present invention, since calculating means for smoothing the lift data within the tolerance, and profile data conversion means which converts the smoothed compensated lift data into the profile data are involved, the lift data is smoothed within the tolerance and higher order fluctuating components are removed in the compensated lift data, so that the follow-up of the main spindle and tool-feed shaft in the servo-control mechanism with respect to the command value is improved. Since the higher order fluctuating components are removed, high frequency vibrations in the servo-control mechanism are suppressed, which results in improvement of the accuracy of the machined surface. Furthermore, since the profile line is commanded in a smooth curve, the higher frequency follow-up is not necessary for the servo-control mechanism, enabling a fast machining speed.

What is claimed is:

1. A numerical control apparatus, in which the shape of a non-circular workpiece is converted into profile data indicating the relationship between the rotational angle $\theta$ of a main spindle and the position X of a tool-feed shaft responsive to specified lift data and a grinder diameter, and maintaining of said non-circular workpiece is controlled responsive to said profile data, comprising:

lift data memory means for storing said lift data, tolerance memory means for storing the tolerance of the finished shape of said non-circular workpiece, calculation means for smoothing said lift data within said tolerance, profile data conversion means for converting compensated lift data smoothed by said calculation means into the profile data, and position control means for numerically controlling said main spindle rotational angle and said tool-feed shaft in response to said profile data, wherein said calculation means comprises means for determining a regression polynomial defining a regression curve approximating the point sequence given by said lift data within said tolerance to generate said compensated lift data from the point on said regression curve.

2. A numerical control apparatus according to claim 1, wherein the order of said regression polynomial is increased until the difference between the point on said regression curve and the corresponding point given by said lift data becomes less than said tolerance.

3. A numerical control apparatus according to claim 1, wherein the number of points to be approximated by said regression curve is decreased until the difference between the point on said regression curve and the corresponding point given by said lift data becomes less than said tolerance.

4. A numerical control apparatus according to claim 1, wherein said regression curve approximates the point sequence selected within a narrow domain of the rotational angle given by said lift data, and one of said compensated lift data is generated from the central point of said domain on said regression curve, and by executing successively such a process with shifting said domain by a certain angle until all the compensated lift data are generated.

5. A numerical control method, in which the shape of a non-circular workpiece is converted into profile data indicating the relationship between the rotational angle $\theta$ of a main spindle and the position X of a tool-feed shaft responsive to specified lift data and a grinder diameter, and machining of said non-circular workpiece is controlled responsive to said profile data, comprising the steps of:

storing said lift data, storing the tolerance of the finished shape of said non-circular workpiece, smoothing said lift data within said tolerance, converting compensated lift data smoothed by said calculation means into the profile data, numerically controlling said main spindle rotational angle and said tool-feed shaft in response to said profile data, wherein said smooothing step comprises determining a regression polynomial defining a regression curve approximating the point sequence given by said lift data within said tolerance to generate said compensation lift data from the point on said regression curve.

6. A numerical control method according to claim 5, wherein said regression curve approximates the point sequence selected within a narrow domain of the rotational angle given by said lift data including the steps of generating one of said compensated lift data from the central point of said domain on said regression curve, and executing successively such a process with shifting of said domain by a certain angle until all the compensated lift data are generated.

* * * * *